United States Patent
Pawlik et al.

(10) Patent No.: US 7,476,444 B2
(45) Date of Patent: *Jan. 13, 2009

(54) LAYER OF REACTION PRODUCT OF EPOXY AND PHOSPHORUS MATERIALS AND CURING AGENT ON SUBSTRATE

(75) Inventors: Michael J. Pawlik, Glenshaw, PA (US); Dennis W. Jones, Glenshaw, PA (US); Ralph C. Gray, Butler, PA (US); Richard M Nugent, Jr., Allison Park, PA (US); Yves Le Disert, Saint Saulve (FR); Laurent Deronne, Vendegies sur écaillon (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 71 days.

This patent is subject to a terminal disclaimer.

(21) Appl. No.: 11/521,823

(22) Filed: Sep. 15, 2006

(65) Prior Publication Data

US 2007/0009742 A1 Jan. 11, 2007

Related U.S. Application Data

(60) Continuation of application No. 10/880,942, filed on Jun. 30, 2004, now Pat. No. 7,141,619, which is a division of application No. 10/288,774, filed on Nov. 6, 2002, now abandoned.

(51) Int. Cl.
*B05D 3/02* (2006.01)
*B32B 15/08* (2006.01)
*B32B 27/38* (2006.01)
*C08K 3/20* (2006.01)
*C08G 59/14* (2006.01)
*C08L 63/02* (2006.01)
*C09D 5/08* (2006.01)

(52) U.S. Cl. .......... 428/418; 106/14.12; 427/386; 428/413; 523/402; 523/414; 523/415; 523/416; 523/420; 523/451; 523/458; 523/466; 525/123; 525/161; 525/176; 525/182; 525/327.3; 525/423; 525/438; 525/510; 525/511; 525/523; 525/528; 525/533; 528/108

(58) Field of Classification Search .......... None
See application file for complete search history.

(56) References Cited

U.S. PATENT DOCUMENTS

| 4,722,981 | A | 2/1988 | Koenig et al. | 525/481 |
|---|---|---|---|---|
| 4,857,566 | A | 8/1989 | Helbling | 523/409 |
| 5,001,173 | A | 3/1991 | Anderson et al. | 523/406 |
| 5,034,556 | A | 7/1991 | Kahle, II | 558/155 |
| 5,086,094 | A | 2/1992 | Massingill, Jr. | 523/414 |
| 5,294,265 | A | 3/1994 | Gray et al. | 148/250 |
| 5,306,526 | A | 4/1994 | Gray et al. | 427/309 |
| 5,389,704 | A | 2/1995 | Yabu | 523/406 |
| 5,773,533 | A | 6/1998 | Horold | 525/533 |
| 6,008,462 | A | 12/1999 | Soltwedel | 219/91.2 |
| 6,217,674 | B1 | 4/2001 | Gray et al. | 148/247 |
| 6,440,580 | B1 | 8/2002 | Berger et al. | 428/623 |
| 6,641,923 | B2 | 11/2003 | Sadvary et al. | 428/447 |
| 6,750,274 | B2 | 6/2004 | Gray et al. | 523/458 |
| 6,984,674 | B2 | 1/2006 | Gray et al. | 523/416 |
| 7,141,619 | B2 * | 11/2006 | Pawlik et al. | 523/402 |
| 7,147,897 | B2 * | 12/2006 | Pawlik et al. | 427/386 |
| 2001/0032966 | A1 | 10/2001 | Schmidt | 252/387 |
| 2002/0151635 | A1 | 10/2002 | Gray et al. | 524/439 |
| 2004/0086718 | A1 * | 5/2004 | Pawlik et al. | 428/413 |
| 2005/0027042 | A1 * | 2/2005 | Pawlik et al. | 523/400 |

FOREIGN PATENT DOCUMENTS

| EP | 0157392 | 10/1985 |
|---|---|---|
| EP | 0156437 | 9/1988 |
| GB | 2345454 | 7/2000 |
| JP | 63-083172 | 4/1988 |
| JP | 06071807 | 3/1994 |
| JP | 07304853 | 11/1995 |
| WO | WO00/68325 | 11/2000 |
| WO | WO01/30923 | 5/2001 |
| WO | WO01/85860 | 11/2001 |

* cited by examiner

*Primary Examiner*—Robert Sellers
(74) *Attorney, Agent, or Firm*—Diane R. Meyers; Donald R. Palladino

(57) ABSTRACT

A corrosion resistant, alkali resistant coating composition is disclosed. The composition comprises a binder comprising a reaction product of an epoxy-containing material and a phosphorus-containing material together with a curing agent. Aminoplasts, especially melamine-based aminoplasts, are particularly suitable curing agents. A source of silicon can optionally be included. The compositions also provide excellent adhesion and can be used with or without a weldable primer. The compositions are applied to and cured on a metal substrate.

10 Claims, No Drawings

LAYER OF REACTION PRODUCT OF EPOXY AND PHOSPHORUS MATERIALS AND CURING AGENT ON SUBSTRATE

CROSS-REFERENCE TO RELATED APPLICATION

This application is a continuation of application Ser. No. 10/880,942 filed Jun. 30, 2004, now U.S. Pat. No. 7,141,619, which is a division of U.S. patent application Ser. No. 10/288,774, filed Nov. 6, 2002, now abandoned.

FIELD OF THE INVENTION

The present invention relates to coatings for metal substrates, and more specifically, to coatings that offer both corrosion resistance and alkali resistance.

BACKGROUND OF THE INVENTION

It is known to treat various metals with compositions that will promote such things as corrosion resistance and adhesion between the metal and other coatings. While use of chromium compounds provides corrosion resistance and adhesion, such compounds are undesirable because of their toxicity and problems with their disposal. Many compounds that provide or approach the level of corrosion protection and/or adhesion offered by chromium compounds, however, do not provide adequate alkali resistance, which is also a desirable quality. Alkali resistant pretreatments can mitigate cathodic delamination. Also, in cases where such a composition is applied on preprimed metal, an alkaline cleaner is often employed after fabrication prior to further coating. Thus, improved compositions that provide good corrosion resistance, adhesion, and alkali resistance are desired. It is especially desired that such compositions allow for weldability, either when used alone or in conjunction with a weldable primer.

SUMMARY OF THE INVENTION

The present invention provides a coating comprising a novel resinous binder/curing agent combination that provides both corrosion and alkali resistance, while at the same time providing excellent adhesion between the metal substrate and any subsequent coatings. In one embodiment, silicon is used in the composition to provide enhanced corrosion protection without significantly interfering with weldability. The compositions can be used, if desired, with a weldable primer.

Silicon is thought to offer corrosion inhibition by acting as a sacrificial anode for the metal being coated. As such, the metal is protected cathodically from corrosion by the silicon. In addition to this cathodic protection, the silicon is also thought to act as an oxygen scavenger. As the various coating layers on a substrate age, water and oxygen slowly diffuse so as to come into contact with the silicon. The silicon reacts with these substances to produce oxides, such as silicon dioxide ($SiO_2$), which protect against corrosion. The inventors do not wish to be bound by any mechanisms, however.

DETAILED DESCRIPTION OF THE INVENTION

The present invention is directed to a composition comprising a binder and a curing agent. More specifically, the binder is a resinous binder comprising a reaction product of one or more epoxy-functional materials and one or more phosphorus-containing materials. The reaction product can be a β-hydroxy phosphorus ester having reactive functional groups. These functional groups are typically hydroxyl groups, including acidic hydroxyls, and/or epoxy groups, depending on the equivalent ratio of the phosphorus-containing material to epoxy-containing material. "Phosphorus ester" will be understood as including both phosphate and phosphonate esters.

Suitable epoxy-functional materials for use in preparing the binders of the present invention contain at least one epoxy or oxirane group in the molecule, such as monoglycidyl ethers of a monohydric phenol or alcohol or di- or polyglycidyl ethers of polyhydric alcohols. In one embodiment, the epoxy-functional material contains at least two epoxy groups per molecule and has aromatic or cycloaliphatic functionality to improve adhesion to a metal substrate. In some embodiments, the epoxy-functional materials may be relatively more hydrophobic than hydrophilic in nature. In one embodiment, the epoxy-containing material is a polymer having a number average molecular weight (Mn) of from about 220 to 25,000, such as 220 to 4500. The Mn can be determined, for example, by multiplying the epoxy equivalent weight (epoxy equivalent) by the epoxy functionality (number of epoxy groups). Good alkali resistance is typically obtained when the Mn of the epoxy-containing material is greater than 1000, such as greater than 1500.

Examples of suitable monoglycidyl ethers of a monohydric phenol or alcohol include phenyl glycidyl ether and butyl glycidyl ether. Suitable polyglycidyl ethers of polyhydric alcohols can be formed by reacting epihalohydrins with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and especially epichlorohydrin.

Suitable polyhydric alcohols can be aromatic, aliphatic or cycloaliphatic and include but are not limited to phenols that are at least dihydric phenols, such as dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis (2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane (bisphenol A), which is especially suitable. Aliphatic polyhydric alcohols that can be used include but are not limited to glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

Epoxy-containing polymers useful in the present invention are disclosed in U.S. Pat. Nos. 5,294,265; 5,306,526 and 5,653,823, which are hereby incorporated by reference. Other useful epoxy-containing materials include epoxy-functional acrylic polymers, glycidyl esters of carboxylic acids and mixtures thereof. Suitable commercially available epoxy-containing polymers are available from Shell Chemical Company under the names EPON 836, EPON 828, EPON 1002F and EPON 1004F. EPON 836 and EPON 828 are epoxy-functional polyglycidyl ethers of bisphenol A prepared from bisphenol A and epichlorohydrin. EPON 828 has an Mn of about 400 and an epoxy equivalent weight of about 185 to 192. EPON 836 has an Mn of about 625 and an epoxy equivalent weight of about 310 to 315. EPON 1002F has an Mn of about 1300 and an epoxy equivalent weight of about 650, while EPON 1004F has an Mn of about 1840 and an epoxy equivalent weight of about 920.

As discussed above, the epoxy-containing material is reacted with one or more phosphorus-containing materials to form an ester, such as an organophosphate or organophosphonate. Suitable phosphorus-containing materials include phosphonic acids, phosphorous acid, phosphoric acids including super- and poly-, and mixtures thereof. Phosphoric acids are particularly suitable.

Examples of suitable phosphonic acids include those having at least one group of the structure:

where R is —C—, such as $CH_2$ or $O-CO-(CH_2)_2-$. Nonlimiting examples of suitable phosphonic acids include 1-hydroxyethylidene-1,1-diphosphonic acid, methylene phosphonic acids, and alpha-aminomethylene phosphonic acids containing at least one group of the structure:

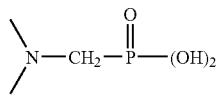

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

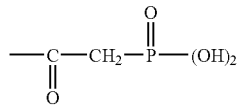

Nonlimiting examples of suitable phosphonic acids include benzylaminobis(methylene phosphonic) acid, cocoaminobis (methylene phosphonic) acid, triethylsilylpropylamino(methylene phosphonic) acid and carboxyethyl phosphonic acid.

The equivalent ratio of the phosphorus-containing material to the epoxy-containing material is within the range of 0.3 to 5.0:1, such as 0.5 to 3.5:1. When using phosphorus to epoxy materials in this ratio, typically only hydroxyl groups will be present on the β-hydroxy phosphorus ester reaction product. The epoxy-containing material and the phosphorus-containing material can be reacted together by any suitable method known to those skilled in the art, such as the reverse phosphatization reaction in which the epoxy-containing material is added to the phosphorus-containing material.

The resinous binder of the present invention also comprises a curing agent having functional groups that are reactive with the functional groups of the epoxy/phosphorus reaction product described above. The curing agent can be selected from aminoplasts, polyisocyanates, polyacids, organometallic acid-functional materials, polyamines, polyamides and mixtures of these, depending on the functional groups present in the reaction product. The selection of the appropriate curing agent(s) is well within the skills of those practicing in the art.

Suitable aminoplasts can be obtained from the condensation reaction of formaldehyde with an amine or amide. Examples include but are not limited to melamine, urea and benzoguanamine. Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. A particularly suitable aminoplast is a melamine formaldehyde condensate having imino groups, especially such an aminoplast having at least 40 weight percent imino groups. In certain embodiments, at least a portion of the methylol groups can be etherified with an alcohol to modify the cure response. Any monohydric alcohol like methanol, ethanol, n-butyl alcohol, isobutanol, and hexanol can be employed for this purpose. Suitable aminoplast resins are commercially available, for example, from Cytec Industries, Inc. in its CYMEL line and from Solutia, Inc. in its RESIMENE line. Particularly suitable products are CYMEL 385 (especially for water-based compositions), CYMEL 1158 imino-functional melamine formaldehyde condensates, and CYMEL 303.

As noted above, polyisocyanate curing agents can also be used. As used herein, the term "polyisocyanate" is intended to include blocked (or capped) polyisocyanates as well as unblocked polyisocyanates. The polyisocyanate can be aliphatic, aromatic, or mixtures thereof. Although higher polyisocyanates such as isocyanurates of diisocyanates are often used, diisocyanates can be used. Higher polyisocyanates also can be used in combination with diisocyanates. Isocyanate prepolymers, for example reaction products of polyisocyanates with polyols, can also be used, as can mixtures of polyisocyanates.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. Other useful curing agents comprise blocked polyisocyanate compounds, such as the tricarbamoyl triazine compounds described in detail in U.S. Pat. No. 5,084,541, which is incorporated herein by reference. U.S. Pat. No. 4,346,143, column 5, lines 45-62, describes blocked or unblocked di- or polyisocyanates such as toluene diisocyanate blocked with caprolactam and is also incorporated by reference herein. A toluene diisocyanate blocked with caprolactam is commercially available from Bayer Corporation under the trademark DESMODUR BL 1265.

Suitable polyacid curing agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Polyacid curing agents are described in further detail in U.S. Pat. No. 4,681,811 at column 6, line 45 to column 9, line 54, which is incorporated herein by reference.

Useful organometallic complexed materials that can be used as curing agents include a stabilized ammonium zirconium carbonate solution commercially available from Magnesium Elektron, Inc. as BACOTE 20, stabilized ammonium, zirconium carbonate, and a zinc-based polymer crosslinking agent commercially available from Ultra Additives Incorporated as ZINPLEX 15.

Examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Suitable aliphatic and alicyclic diamines include 1,2-ethylene diamine, 1,2-propylene diamine, 1,8-octane diamine, isophorone diamine, propane-2,2-cyclohexyl amine, and the like; suitable aromatic diamines include phenylene diamines and toluene diamines, for example o-phenylene diamine and p-tolylene diamine. These and other suitable polyamines are described in detail in U.S. Pat. No. 4,046,729 at column 6, line 61 to column 7, line 26, which is incorporated herein by reference.

Appropriate mixtures of curing agents may also be used in the invention.

The weight percent of the binder in the present compositions typically ranges from about 50 to 100 percent, such as 75 to 95 percent, or 80 to 90 percent, with weight percent based on the total weight of the composition. The weight percent of the curing agent, if used, generally ranges from 5 to 25 weight percent based on the total weight of the resinous binder.

The present compositions comprising the epoxy/phosphorus reaction product and curing agent provide excellent corrosion resistance, alkali resistance and adhesion properties. Significantly, this composition can be used in conjunction with a weldable primer, without significantly impacting weldability. In such embodiments, the weldable primer is typically directly adjacent to a cured layer deposited from the present compositions. When used with a weldable primer, the present compositions are typically deposited so as to form a coating layer that is thick enough to provide corrosion resistance without inhibiting welding; thicknesses much greater than about 1.0 micron can negatively impact welding such that their use would be undesirable, and thicknesses much less than 0.1 would not provide suitable corrosion resistance. A thickness of between about 0.2 and 0.8 microns is typically suitable.

Any weldable primer can be used in conjunction with the present composition. A "weldable primer" will be understood as a composition comprising one or more electroconductive pigments that provide electroconductivity to the weldable coating and one or more binders that adhere the electroconductive pigment to the substrate or any pretreatment coating deposited on the substrate. Commercially available weldable primers include BONAZINC 3000, BONAZINC 3001, and BONAZINC 3005, from PPG Industries, Inc.

The present compositions further comprise a source of silicon. Silicon can be obtained, for example, in powder form or pieces. For use in the present invention, the average particle size of silicon can be 0.2 to 10 microns, such as 1 to 5 microns. The size of the silicon particle used can be determined based on the desired thickness of the coating layer. Silicon is commercially available in a number of grades, such as technical grade, high purity and ultra-high purity. High purity silicon is a waste product of wafer production in the electronics industry and is therefore readily available. Suitable commercially available products include SI-1059 from Elkem (average particle size of <10μ; 99.20% silicon) and SI-100 from AEE (average particle size between 1 and 5μ; 99.20% silicon). The weight ratio of silicon to binder/curing agent is typically from about 0.01 to 1.0. The weight percent of silicon in the total composition is typically from about 1.0 to 30.0. It will be understood that silicon is a semiconductive material; a semiconductive material is a substance having two separate bands of "energy equivalent" molecular orbitals that are very close in energy. The lower energy band is completely filled with "paired" electrons and the higher energy band is completely empty of electrons. Since the energy gap between the two bands is very small, thermal energy can promote electrons from the lower filled band to the higher unfilled band producing band(s) that have small numbers of unpaired electrons, which in turn permits the establishment of a weak electric current. The present compositions are substantially free of conductive pigments; a conductive pigment is one that, on a molecular scale, has a partially filled band of "energy equivalent" molecular orbitals. This partially filled band has many "unpaired" electrons that are able to move freely from atom to atom within the conductive pigment matrix. The free flow of electrons within the matrix produces an electric current. "Substantially free" means that there is <1 weight percent of conductive pigment in the composition, such as <0.5 weight percent or even <0.1 weight percent.

When the present compositions comprise silicon, they can still be used in conjunction with a weldable primer, as described above. The thickness of the deposited layer under the weldable primer is typically from about 0.01 to 2, such as 0.01 to 0.5.

It has been surprisingly discovered that the present silicon-containing compositions can also be used without a weldable primer. These compositions, as noted above, are substantially free of conductive pigments. When used without a weldable primer, the present silicon-containing compositions are typically applied in a thickness of about 2.2 microns or less.

The present coating compositions may contain a diluent added to adjust the viscosity of the coating composition. For application to a substrate, the present compositions should typically have a viscosity of from about 30 to 180 seconds as measured by a No. 4 Ford Cup. If a diluent is used, it should be selected so as not to detrimentally affect the adhesion of the curable coating composition to a metal substrate. Useful diluents include water ("aqueous based"), organic solvents (which would be referred to as either aqueous based or solvent based" depending on which is the major diluent). Water is preferred in many applications, as the use of aqueous-based forms of the present composition can actually result in increased weldability of the coating layer deposited therefrom, as compared with its solvent-based counterpart.

When water is included as a diluent, dispersants, thickeners, defoamers, stabilizers, rheology modifiers, and anti-settling agents are typically used as well. A suitable rheology modifier is available from Rohm and Haas Company as Rheology Modifier RM-8, Experimental. A suitable stabilizing and dispersing agent is potassium tripolyphosphate (KTPP).

Optimally, the aqueous composition contains an amine. Particularly suitable amines are hydroxyl-containing amines. The volatile organic compound content (VOC content) of the aqueous composition will typically be less than 2.4, such as less than 1.7, as determined by Method 24, which will be familiar to those skilled in the art.

The diluent of the present invention can also be an organic solvent. Suitable organic solvents include alcohols having up to about 8 carbon atoms, such as ethanol and isopropanol, and alkyl ethers of glycols, such as 1-methoxy-2-propanol, and monoalkyl ethers of ethylene glycol, diethylene glycol and propylene glycol. In a particularly suitable embodiment, the diluent includes a propylene glycol monomethyl ether or a dipropylene glycol monomethyl ether. A suitable propylene glycol monomethyl ether is available from Dow Chemical Company as DOWANOL PM; a suitable dipropylene glycol monomethyl ether is commercially available as DOWANOL DPM.

Other suitable organic solvents include ketones such as cyclohexanone (preferred), acetone, methyl ethyl ketone, methyl isobutyl ketone and isophorone; esters and ethers such as 2-ethoxyethyl acetate, and propylene glycol methyl ether acetates such as PM ACETATE, commercially available from Dow Chemical Company; and aromatic solvents such as toluene, xylene, and aromatic solvent blends derived from petroleum such as those available as "Solvesso".

The solvent-based composition also can contain an amine for stability purposes. The preferred amines are alkyl substituted morpholine compounds such as N-methyl and N-ethyl morpholine.

The compositions of the invention can further comprise surfactants. Surfactants can be used to improve the wetting of the substrate. Generally, surfactants are present in an amount of less than about 2 weight percent on a basis of total weight of the coating composition. Suitable surfactants are commercially available from Air Products and Chemicals, Inc. in their SYRFYNOL line, such as SURFYNOL 104 PA.

The coating composition of the present invention can also include corrosion resistant pigments. Suitable corrosion resistant pigments include, but are not limited to, zinc phosphate, calcium ion-exchanged silica, colloidal silica, synthetic amorphous silica, and molybdates such as calcium molybdate, zinc molybdate, barium molybdate, strontium molybdate, and mixtures thereof. Suitable calcium ion-exchanged silica is commercially available from W.R. Grace & Co. as SHIELDEX AC3. Suitable colloidal silica is available from Nissan Chemical Industries, Ltd. as SNOWTEX. Suitable amorphous silica is available from W.R. Grace & Co. as SYLOID. If corrosion resistant pigments are used, they are typically not used in amounts that will interfere with weldability, that is, about 20 weight percent or less, based on the total weight of the composition.

Other optional ingredients include inorganic lubricants such as molybdenum disulfide particles that are commercially available from Climax Molybdenum Marketing Corporation, extender pigments such as iron oxides and iron phosphides, flow control agents, thixotropic agents such as silica, montmorillonite clay and hydrogenated castor oil, anti-settling agents such as aluminum stearate and polyethylene powder, dehydrating agents that inhibit gas formation such as silica, lime or sodium aluminum silicate, and wetting agents including salts of sulfated castor oil derivatives such as those commercially available from Cognis Corporation as RILANIT R4.

In one embodiment, the coating compositions are substantially free of chromium-containing materials, i.e., contain less than about 2 weight percent of chromium-containing materials (expressed as $CrO_3$), less than about 0.05 weight percent of chromium-containing materials, or about 0.00001 weight percent. Examples of chromium-containing materials include chromic acid, chromium trioxide, chromic acid anhydride, dichromate salts such as ammonium dichromate, sodium dichromate, potassium dichromate, and calcium chromate. In another embodiment, the present compositions contain no zeolite.

In practice, the coating composition of the present invention will be applied to a metal substrate and then cured. Appropriate thicknesses for the present compositions are described above, and can be further determined by one skilled in the art based on the particular needs of the user. The present compositions, when used with a weldable primer, will be cured before application of the primer.

Metal substrates used in the practice of the present invention include ferrous metals, non-ferrous metals and combinations thereof. Suitable ferrous metals include iron, steel, and alloys thereof. Nonlimiting examples of useful steel materials include cold rolled steel, galvanized (zinc coated) steel, electrogalvanized steel, stainless steel, pickled steel, zinc-iron alloy such as Galvanneal, Galvalume and Galfan zinc-aluminum alloys and combinations thereof. Useful non-ferrous metals include aluminum, zinc, magnesium and alloys thereof. Combinations or composites of ferrous and non-ferrous metals can also be used.

At application, the temperature of the coating composition is typically from about 10° C. to 85° C., such as from about 15° C. to 60° C. For aqueous-based coating compositions, the pH of the coating composition at application generally ranges from about 7.0 to about 12.0, such as about 8.0 to about 10.5. Water-soluble or water-dispersible acids and/or bases can be used to adjust pH, if needed.

The present invention is therefore further directed to a process for coating a metal substrate by applying any of the compositions described above to the substrate and curing the coating to form a layer on the substrate. The layer is a corrosion resistant layer, an alkali resistant layer, an adhesive layer and, in some cases, a weldable layer. The substrate, composition and curing temperatures and application methods are all as described above.

The compositions of the invention can be applied to the surface of a metal substrate by any conventional application technique, such as spraying, immersion or roll coating in a batch or continuous process. Squeegee or wringer rolls can be used to remove excess coating. After application, the coating is cured to form a cured coating upon the metal substrate. Curing can be achieved at peak metal temperatures of greater than or equal to 75° C., such as from 75° C. to 200° C. Peak metal temperatures of from about 100° C. to 150° C. are particularly suitable. Cure times typically range from 2 seconds to 60 minutes, such as $\geq 10$ seconds.

As discussed above, the present compositions provide corrosion resistance to the metal substrates to which they are applied. It has been surprisingly discovered that the present compositions also provide alkaline resistance to these substrates. Alkaline or alkali resistance refers to the ability of a compound to resist removal when exposed to standard automotive cleaners up to a pH of 14, such as greater than a pH of 13. It is believed that the use of an aminoplast curing agent, particularly a melamine-formaldehyde condensate and more particularly such a condensate having greater than about 40 weight percent of imino groups, contribute to alkali resistance. Accordingly, the present invention is further directed to a method for improving the alkali resistance of a pretreatment layer comprising adding an aminoplast to the composition from which the layer is deposited. A nonchrome alkali resistant pretreatment having a coating deposited thereon is also within the scope of the present invention. Such a combination exhibits less than 10 percent, such as 5 percent or less, of coating removal when cleaned with an alkaline cleaner having a pH of 13 or higher. It will be appreciated that such cleaners can attack certain types of pretreatment layers, with the result being that the coating deposited on the pretreatment layer is removed. The present compositions allow for exceptional coating retention after alkaline cleaning.

In addition to corrosion resistance and alkali resistance, the present compositions have excellent adhesive characteristics; for example, at a thickness of 2.2 microns or less, the present compositions have excellent adhesive strength as determined by deformation test methods standard in the art such as ASTM E643 and ASTM D2794-93. The present invention is therefore further directed to a nonchrome pretreatment layer deposited on a substrate, wherein the thickness of the layer is less than or equal to 2.2 microns and wherein 10 percent or less, such as 5 percent or less, of the coating is removed from the substrate when tested according to ASTM E643 or ASTM D2794-93.

EXAMPLES

The following examples are intended to illustrate the invention, and should not be construed as limiting the invention in any way.

Example 1

To a 4-neck 3-liter round-bottom flask fitted with a reflux condenser, a mechanical stirrer and a nitrogen inlet, were charged at ambient temperature 36.9 grams (0.32 mole) of 85% phosphoric acid and 50 grams of propylene glycol monomethyl ether (DOWANOL PM) obtained from Dow Chemical. The mixture was heated with stirring to 99° C. while maintaining a nitrogen blanket. A solution comprising 554 grams (0.3 mole) of diglycidylether from epichlorohydrin and bisphenol A (EPON 1004F obtained from Shell Chemical Company) and 553 grams of DOWANOL PM was added to the flask from an addition funnel at 99° C. to 100° C. over 52 minutes. The reaction mixture was then held at 100° C. for 53 minutes at which time the epoxy equivalent weight was determined to be greater than 20,000. Next, 21.6 grams of deionized water were added and the reaction mixture was held at 100° C. to 104° C. for 123 minutes. The reaction mixture was then cooled to 82° C., and a vacuum was applied; 253 grams of distillate were removed. To the reaction mixture was then added 57 grams (0.64 moles) of dimethylethanol amine dissolved in 100 grams of deionized water over 8 minutes at 82° C. After mixing well, 934.5 grams of deionized water (preheated to approximately 70° C.) were added to the reaction mixture at 72° C. to 57° C. over 30 minutes. The reaction mixture was then cooled and poured into a plastic container. The solids of the resin solution were determined to be 31.1%, and the acid number was determined to be 18.1.

Example 2

At ambient temperature, a water-based, alkali resistant coating composition was made by first adding 24.1 grams of an acetylenic surfactant (SURFYNOL 104DPM obtained from Air Products and Chemicals, Inc); 11.47 grams of a polyurethane rheology modifier (RM-8 obtained from Rohm and Haas); 12.0 grams of a proprietary defoamer (SURFYNOL DF210 obtained from Air Products and Chemicals, Inc.) to 880.0 grams of the product of Example 1. After stirring the resultant mixture for 15 minutes with a Cowles blade, 72.4 grams of a melamine-formaldehyde condensate (CYMEL 385 obtained from Cytec Industries, Inc.) was added and the entire mixture was stirred for an additional 10 minutes. The initial viscosity was about 72 seconds (#4 Ford Cup), and a grind gauge measurement was determined to be greater than 7 (Hegman).

Example 3

At ambient temperature, a water-based, alkali resistant coating composition was made by first adding 78.1 grams of calcium exchanged silica (SHIELDEX AC3 obtained from Davison Chemical Division of W.R. Grace & Co.) to 77.5 grams of deionized water. The mixture was stirred with a Cowles blade for 5 minutes. While continuing to stir the mix with a Cowles blade, the following components were added sequentially in one-minute intervals: 20.3 grams of SUR-FYNOL 104DPM; 740.4 grams of the product of Example 1; 12.7 grams of Rheology Modifier RM-8; and 10.1 grams of SURFYNOL DF210. After stirring the resultant mixture for 15 minutes with a Cowles blade, 60.9 grams of CYMEL 385 was added and the entire mixture was stirred for an additional 10 minutes. The initial viscosity was about 139 seconds (#4 Ford Cup), and a grind gauge measurement was determined to be about 4.5 (Hegman).

Example 4

At ambient temperature, a water-based alkali resistant coating composition was made by first adding 97.4 grams of elemental silicon (SI-1059 obtained from Elkem Metals Co.) to 75.8 grams of deionized water. The mixture was stirred with a Cowles blade for 5 minutes. While continuing to stir the mix with a Cowles blade, the following components were added sequentially in one-minute intervals: 19.9 grams of SURFYNOL 104DPM; 725.0 grams of the product of Example 1; 12.4 grams of Rheology Modifier RM-8; and 9.9 grams of SURFYNOL DF210. After stirring the resultant mixture for 15 minutes with a Cowles blade, 59.7 grams of CYMEL 385 was added and the entire mixture was stirred for an additional 10 minutes. The initial viscosity was about 136 seconds (#4 Ford Cup), and a grind gauge measurement was determined to be about 4 (Hegman).

Example 5

At ambient temperature, a water-based alkali resistant coating composition was made by first adding 64.2 grams of elemental silicon SI-1059 to 78.6 grams of deionized water. The mixture was stirred with a Cowles blade for 5 minutes. While continuing to stir the mix with a Cowles blade, the following components were added sequentially in one-minute intervals: 20.6 grams of SURFYNOL 104DPM; 751.6 grams of the product of Example 1; 12.9 grams of Rheology Modifier RM-8; and 10.2 grams of SURFYNOL DF210. After stirring the resultant mixture for 15 minutes with a Cowles blade, 6.19 grams of CYMEL 385 was added and the entire mixture was stirred for an additional 10 minutes. The initial viscosity was about 127 seconds (#4 Ford Cup), and a grind gauge measurement was determined to be about 4 (Hegman).

Example 6

At ambient temperature, a water-based alkali resistant coating composition was made by first adding 133.6 grams of elemental silicon SI-1059 to 72.8 grams of deionized water. The mixture was stirred with a Cowles blade for 5 minutes. While continuing to stir the mix with a Cowles blade, the following components were added sequentially in one-minute intervals: 19.1 grams of SURFYNOL 104DPM; 695.9 grams of the product of Example 1; 11.9 grams of Rheology Modifier RM-8; and 9.5 grams of SURFYNOL DF210. After stirring the resultant mixture for 15 minutes with a Cowles blade, 57.3 grams of CYMEL 385 was added and the entire mixture was stirred for an additional 10 minutes. The initial viscosity was about 145 seconds (#4 Ford Cup), and a grind gauge measurement was determined to be about 4 (Hegman).

Example 7

At ambient temperature, a water-based alkali resistant coating composition was made by first adding 189.5 grams of elemental silicon SI-1059 to 152.1 grams of deionized water. The mixture was stirred with a Cowles blade for 5 minutes. While continuing to stir the mix with a Cowles blade, the following components were added sequentially in one-minute intervals: 15.8 grams of SURFYNOL 104DPM; 577.3 grams of the product of Example 1; 9.9 grams of Rheology Modifier RM-8; and 7.9 grams of SURFYNOL DF210. After stirring the resultant mixture for 15 minutes with a Cowles blade, 47.5 grams of CYMEL 385 was added and the entire mixture was stirred for an additional 10 minutes. The initial viscosity was about 99 seconds (#4 Ford Cup), and a grind gauge measurement was determined to be about 4 (Hegman).

Example 8

To a 4-neck 3-liter round-bottom flask fitted with a reflux condenser, a mechanical stirrer and a nitrogen inlet, were charged at ambient temperature 113.56 grams (0.985 mole) of 85 percent phosphoric acid and 58.82 grams of propylene glycol monomethyl ether (DOWANOL PM) obtained from Dow Chemical plus 10.92 grams of Rhodamine B/DEN-438 adduct. The mixture was heated with stirring to 90° C. while maintaining a nitrogen blanket. A solution comprising 347.19 grams (0.923 mole) of diglycidylether from epichlorohydrin and bisphenol A (EPON 880 obtained from Shell Chemical Company) and 115.98 grams of DOWANOL PM was added to the flask from an addition funnel at 90° C. to 100° C. over 60 minutes. The reaction mixture was then held at 90° C. for 60 minutes at which time the epoxy equivalent weight was determined to be greater than 20,000. Next, 62.24 grams of deionized water were added and the reaction mixture was held at 90° C. for 240 minutes. The reaction mixture was then cooled to 70° C. To the reaction mixture was added 7.77 grams of ammonium bifluoride (0.136 mole) diluted with 50 g of deionized water. To the reaction mixture at 50° C. was then added 170.2 grams (2.00 moles) of ammonia at 20 percent in deionized water dissolved with 54.37 grams of deionized water over 20 minutes (added to the flask from an addition funnel) leading to an exotherm at 60° C. After mixing well over 30 minutes, the reaction mixture was then cooled at 35° C. and 86.61 grams of CYMEL 303 (melamine formaldehyde condensate from CYTEC Industries, Inc.) was added to the mixture and the entire mixture was stirred for an additional 30 minutes, then poured into a plastic container. The solids of the resin solution were determined to be at 53 percent and the pH for a 5 percent solution in deionized water was in the range of 7.0 to 7.5.

Example 9

Panel Preparation

Two-sided 60G Electrogalvanized steel (EG) panels were obtained from USX Corporation and Sollac Steel. Each panel was 15.3 centimeters (cm) wide and 38.1 cm long. The steel panels were subjected to an alkaline cleaning process by spray in a 0.85 percent by weight bath of PARCO 338 (P338 from Henkel, Inc.) at a temperature of 65° C. for 10 seconds. The panels were removed from the alkaline cleaning bath, rinsed with room temperature deionized water (about 21° C.) for 5 seconds and dried with warm air (about 40° C.).

Adhesion and Corrosion Testing of Present Compositions as a Pretreatment Layer

After cleaning, the steel panels were coated with either a 5 percent solids deionized water solution of Example 2 or Example 8. The 5 percent solids solutions of Examples 2 and 8 were applied via Roll Coat application (40psi; 210 rpm) and baked for 15 seconds until a peak metal temperature of 100° C. was achieved. Pretreatment controls included a commercial chromium pretreatment B4513 (available from Henkel) and a commercial organic pretreatment NUPAL 456BZR (a phosphatized epoxy product from PPG Industries, Inc.). All of the panels were subsequently coated with a commercially available Weldable Primer, BZ3000 (PPG Industries, Inc.) at 3 to 3.5 microns.

Flat panels prepared as described above were compared in standard adhesion (MEK rubs) and corrosion testing according to Industry Standard Procedure GM 9511P for 20 cycles. Results are shown in TABLE 1.

TABLE 1

| SUBSTRATE TESTED | Pretreatment 'Coating weight' | "MEK Rubs" | APG TESTING PANELS % Red Rust (Degree of White Stain)[1] |
|---|---|---|---|
| USS EG | B4513 chrome '30 mg Cr/m²' | 50+ | 20-30% (Light) |
| USS EG | Nupal 456BZR '80-100 mg/m²' | 50+ | 20-30% (Light) |
| USS EG | Example 2 '80-100 mg/m²' | 50+ | 25-35% (Light) |
| USS EG | Example 8 '80-100 mg/m²' | 50+ | 20-30% (Light) |
| Sollac EG | B4513 chrome '30 mg Cr/m²' | 50+ | 20-30% (Light) |
| Sollac EG | Nupal 456BZR '80-100 mg/m²' | 50+ | 20-30% (Light) |
| Sollac EG | Example 2 '80-100 mg/m²' | 50+ | 25-35% (Light) |
| Sollac EG | Example 8 '80-100 mg/m²' | 50+ | 20-30% (Light) |

[1]Values based on the average of two or more test pieces.

As seen in Table 1, the compositions of the present invention had adhesion and corrosion resistance comparable to that of a commercially available chrome-containing pretreatment.

To simulate the performance of the pretreatments after forming and cleaning, the four pretreatments as described above (on both substrates) were formed into 35 millimeters (mm) cups with an Erichsen Bandprüfmaschine No. 142 from 85 mm disks (draw speed=10). The cups were then exposed to a pH=13.1 alkaline solution (CHEMKLEEN 190 available from PPG Industries, Inc.). Resistance of the pretreatment to the alkaline solution is determined by the amount of BZ3000 removed. Results are shown in Table 2.

TABLE 2

| SUBSTRATE TESTED | Pretreatment 'Coating weight' | Amount of BZ3000 Removed from cup after pH 13 alkaline cleaning[1] |
|---|---|---|
| USS EG | B4513 chrome '30 mg Cr/m²' | 0-5% |
| USS EG | Nupal 456BZR '80-100 mg/m²' | 0-10% |
| USS EG | Example 2 '80-100 mg/m²' | 0-5% |
| USS EG | Example 8 '80-100 mg/m²' | 0-5% |
| Sollac EG | B4513 chrome '30 mg Cr/m²' | 0-5% |
| Sollac EG | Nupal 456BZR '80-100 mg/m²' | 20-30% |
| Sollac EG | Example 2 '80-100 mg/m²' | 0-5% |
| Sollac EG | Example 8 '80-100 mg/m²' | 0-5% |

[1]Values based on the average of two or more test pieces.

Adhesion and Corrosion Testing of Present Compositions as a Weldable Primer

After cleaning, the steel panels were coated directly (no pretreatment) with the composition of Examples 3-7 using wire drawbars and baked for 40 seconds until a peak metal temperature of 154° C. was achieved. The corresponding dried film thickness ("DFT") values for each coating are reported in Table 3. In all cases panels were allowed to air cool to ambient temperatures.

Erichsen Ball Punch Deformation Testing (ASTM E643) and 160 Pound Resistance of Organic Coatings to the Effects of Rapid Deformation (ASTM D2794-93) was conducted. USS EG panels were cleaned with an alkaline cleaner and coated with the compositions of Examples 3-7. The samples were sprayed on the panels for five minutes at 18-20 psi. USS EG panels coated with Examples 3-7 were also tested in GM P9511 P corrosion testing for 20 cycles. Panels coated with the BZ3000 weldable primer without pretreatment and BZ3000 with the B1415A chromium pretreatment (available from Henkel) were also tested. Relative ratings according to the amount of coating removed in the adhesion tests after alkaline cleaning (CHEMKLEEN 490MX available from PPG; pH=12.5; 120° F.; 5 min.) and of the percentage of red rust that formed over the entire tested surface of the panel, as well as the degree of white stain, are shown in Table 3.

Weld Testing

The coating compositions of the present invention were tested for spot weldability by coating two steel sheets on both sides with compositions of the present invention. Efficiency of welding for each variable was determined in accordance with test procedure FLTM BA 13-1 (Ford Laboratory Test Method). The test determines the actual life of the 5.5 mm (F16) electrode welding tips. Welds are done in 100 weld increments. The first 90 welds are done at 0.1 kA below expulsion. Then ten coupons are welded and the nugget size of each weld is measured. The test continues until the average nugget diameter of a 10 coupon set is less than $4\sqrt{t}$, where t is the thickness of one coupon. Results are shown in Table 4.

TABLE 4

| Variable Tested | Pretreatment (PMT Cure) 'Dry Film Thickness' | Number of Welds before Average nugget diameter of a 10 coupon set is less than $4\sqrt{tt}$ |
| --- | --- | --- |
| BZ3000/Cr | Chrome pretreat 490 F PMT 3.5 microns DFT | 500 |
| Example 3 | No pretreatment 310 F PMT 2.0 microns DFT | 100 |
| Example 4 | No pretreatment 310 F PMT 2.0 microns DFT | 500 |
| Example 4 | No pretreatment 310 F PMT 1.0 microns DFT | 900 |

TABLE 3

| Variable Tested | Pretreatment (PMT Cure) 'Dry Film Thickness' | Erichsen bump Amount of Coating Removed after alkaline cleaning[1] | 160 lb Impact Amount of Coating Removed after alkaline cleaning[1] | APG TESTING % Red Rust (Degree of White Stain)[1] |
| --- | --- | --- | --- | --- |
| BZ3000 | No pretreatment (490 F PMT) 3.5 microns DFT | 100% | 100% | 40-50% (Light) |
| BZ3000/Cr | B1415A Chrome (490 F PMT) 3.5 microns DFT | 5-10% | 5-10% | 20-30% (Light) |
| Example 3 | No pretreatment (310 F PMT) 2.0 microns DFT | 5-10% | 5-10% | <5% (Light) |
| Example 4 | No pretreatment (310 F PMT) 2.0 microns DFT | 5-10% | 5-10% | <5% (Light) |
| Example 4 | No pretreatment (310 F PMT) 1.0 microns DFT | 0% | 0% | 20-30% (Light) |
| Example 5 | No pretreatment (310 F PMT) 2.2 microns DFT | 0% | 0% | <5% (Light) |
| Example 6 | No pretreatment (310 F PMT) 2.0 microns DFT | 5-10% | 5-10% | <5% (Light) |
| Example 7 | No pretreatment (310 F PMT) 1.9 microns DET | 5-10% | 5-10% | <5% (Light) |

[1]Values based on the average of two or more test pieces.

TABLE 4-continued

| Variable Tested | Pretreatment (PMT Cure) 'Dry Film Thickness' | Number of Welds before Average nugget diameter of a 10 coupon set is less than $4\sqrt{tt}$ |
|---|---|---|
| Example 5 | No pretreatment 310 F PMT 2.0 microns DFT | 100 |
| Example 6 | No pretreatment 310 F PMT 2.0 microns DFT | 300 |
| Example 7 | No pretreatment 310 F PMT 2.3 microns DFT | 200 |

[1] The welding data included in Table 4 was evaluated using a model 150 AP resistance spot welder from Lors Corporation of Union, New Jersey, equipped with a Model 108B welding controller from Interlock Industries, Inc. and Lors Corporation. The welding current in kilo amperes (kA) was measured using a model MM-315A Weld Checker from Unitek Miyachi Corporation of Monrovia, California. MB 25Z copper welding tips from the Wheaton Company, Inc. of Warminster, Pennsylvania with a starting face diameter of 3/16 inch were used.

The data reported in Tables 3 and 4 above shows that the coating compositions of the present invention compare very favorably with the commercial BZ3000 control. In addition to the increased corrosion resistance and comparable weldability, the compositions of the present invention can be applied at lower film thickness without pretreatment and cured at lower temperatures than commercially available coatings, which typically cure at temperatures of greater than 220° C.

Whereas particular embodiments of this invention have been described above for purposes of illustration, it will be evident to those skilled in the art that numerous variations of the details of the present invention may be made without departing from the invention as defined in the appended claims.

What is claimed:

1. A weldable, corrosion resistant layer deposited on a substrate, wherein the weldable layer has a thickness of from 0.1 micron to 1.0 micron, is substantially free of conductive pigments, and is comprised of the cured reaction product of:
   a) the reaction product of at least one epoxy-functional material and at least one phosphorus-containing material, wherein the equivalent ratio of the phosphorous-containing material to epoxy-containing material is within the range of 1.6:1 and 5:1; and
   b) a curing agent.

2. A coating layer combination comprising the weldable, corrosion resistant layer of claim 1 directly adjacent to a weldable coating layer comprising an electroconductive pigment and a binder.

3. The layer of claim 1, wherein the epoxy-containing material is a polyglycidyl ether of a polyhydric phenol.

4. The layer of claim 3, wherein the polyhydric phenol is Bisphenol A.

5. The layer of claim 1, wherein the number average molecular weight of the epoxy-containing material is 220 to 25,000, as determined by multiplying the epoxy equivalent by the epoxy functionality.

6. The layer of claim 1, wherein the phosphorus-containing material is selected from the group consisting of phosphoric acid, a phosphonic acid, and phosphorous acid.

7. The layer of claim 1, wherein the curing agent is selected from the group consisting of aminoplast resins, polyisocyanates, polyacids, organometallic complexed materials, polyamines, and polyamides.

8. The layer of claim 7, wherein the curing agent is an aminoplast that is a melamine-formaldehyde condensate comprising at least 40 weight percent of imino groups.

9. The layer of claim 1, wherein the weldable, corrosion resistant layer further comprises one or more corrosion resistant pigments.

10. A metal substrate at least partially coated with the weldable, corrosion resistant layer of claim 1.

* * * * *